US006586527B2

(12) United States Patent
Vollenberg et al.

(10) Patent No.: US 6,586,527 B2
(45) Date of Patent: Jul. 1, 2003

(54) POLYESTER RESIN MOLDING COMPOSITIONS

(75) Inventors: Peter Hendrikus Theodurus Vollenberg, Bergen op Zoom (NL); Gerardus Bernardus Wilhelmus Hieltjes, Breda (NL); Franciscus Petrus Maria Mercx, Bergen op Zoom (NL); Aagje Petronella den Breejen, Halsteren (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/814,026

(22) Filed: Mar. 20, 2001

(65) Prior Publication Data

US 2002/0177662 A1 Nov. 28, 2002

(51) Int. Cl.$^7$ ............................................... C08L 67/02
(52) U.S. Cl. ...................................... 525/166; 525/165
(58) Field of Search ............................... 525/166, 165

(56) References Cited

U.S. PATENT DOCUMENTS

| | | | |
|---|---|---|---|
| 2,465,319 A | 3/1949 | Whinfield et al. | |
| 2,675,390 A | 4/1954 | Rosenblatt | |
| 2,888,484 A | 5/1959 | Dehm et al. | |
| 3,047,539 A | 7/1962 | Pengilly | |
| 3,444,237 A | 5/1969 | Jaffe | |
| 3,833,535 A | 9/1974 | Wambach et al. | |
| 4,656,227 A | 4/1987 | Lindner et al. | |
| 4,666,972 A * | 5/1987 | Kohler | 524/504 |
| 4,754,064 A | 6/1988 | Lillwitz | |
| 5,344,892 A | 9/1994 | Natarajan et al. | |
| 5,431,972 A * | 7/1995 | Richeson | 428/36.92 |
| 5,489,640 A | 2/1996 | Riding | |
| 5,804,654 A | 9/1998 | Lo et al. | |
| 5,859,119 A | 1/1999 | Hoefflin | |
| 6,040,370 A | 3/2000 | Wozny et al. | |

FOREIGN PATENT DOCUMENTS

| | | |
|---|---|---|
| DE | 43 07 394 C | 6/1994 |
| EP | 0 488 728 A | 6/1992 |
| EP | 0 520 612 A | 12/1992 |
| EP | 0 846 729 A | 6/1998 |

* cited by examiner

Primary Examiner—Patricia A. Short
(74) Attorney, Agent, or Firm—Oppedahl & Larson LLP

(57) ABSTRACT

Polyester molding compositions, which have improved crystallization and processing, a cycloaliphatic polyester component, and a nucleating agent comprising a fluoropolymer containing a thermoplastic resin.

14 Claims, No Drawings

POLYESTER RESIN MOLDING COMPOSITIONS

BACKGROUND OF THE INVENTION

1. Field of the Invention

The invention relates to nucleated polyester resin and blends thereof.

2. Background of the Invention

The overall crystallization rate of polyesters can be enhanced by several nucleating additives, such as minerals, salts, pigments, etc. Such heterogeneous nucleating agents may however adversely affect mechanical properties and/or polyester stability. U.S. Pat. No. 3,833,535 to Wambach et al, describe the addition of nucleating agents polyesters in column 7, lines 37 to 52. U.S. Pat. No. 5,344,892 to Kavilipalayam et al describes the addition of an alkali metal salt of a polyphenylene ether as a nucleating agent.

It is desirable to obtain enhanced properties for improving the processing and crystallinity of cycloaliphatic resin compositions while retaining the favorable properties. When considering mixtures, blends, and additives to resin blends, it is difficult to obtain an improvement of one property without deleteriously affecting other desirable properties.

SUMMARY OF THE INVENTION

The present invention relates to molding compositions based upon thermoplastic cycloaliphatic polyester resin and blend thereof, which have desirable properties of impact resistance and good processability. The crystallinity and rate of crystallization are desirable improved as compared to known cycloaliphatic polyester compositions.

The polyester molding compositions of the present invention comprise a cycloaliphatic polyester component, and a nucleating agent comprising a fluoropolymer containing thermoplastic resin. The fluoropolymer containing thermoplastic resin is desirably in the form of a free-flowing powder. According to one embodiment, a process for accelerating the crystallization of a resin blend containing a cycloaliphatic polyester component comprises preparing a mixture of the resin components and a fluoropolymer thermoplastic nucleating agent. Also, a shaped article is prepared by shaping a heated plasticized blend which includes the fluoropolymer thermoplastic nucleating agent and cooling the shaped plasticized blend to form a solidified shaped article.

DETAILED DESCRIPTION OF PREFERRED EMBODIMENTS

The nucleating agent is a fluoropolymer-containing thermoplastic resin composition and is prepared by combining a fluoropolymer with a thermoplastic resin according to U.S. Pat. No. 6,040,370 to Wozne et al and U.S. Pat. No. 5,804,654 to Lo et al.

As set forth in U.S. Pat. No. 5,804,654, the tetrafluoroethylene polymerizate comprises particles totally or partially encapsulated by a polymer or copolymer obtained by polymerization of monomers or mixtures of monomers which can be emulsion-polymerized, in particular by radical route. Column 3, line 1 to column 3, line 45 is incorporated into the present application by reference. The resulting fluoropolymer particles are useful as a nucleating agent.

As set forth in U.S. Pat. No. 6,040,370, a fluoropolymer-containing additive is prepared by combing a fluoropolymer in the form of a stabilized aqueous fluoropolymer dispersion including a second polymer with a fatty acid salt. The combined fluoropolymer and second polymer are precipitated. The resulting precipitate is dried to form the fluoropolymer additive. Column 2, line 55 to column 8, line 53, is incorporated into the present specification by reference. The resulting additive is useful as the nucleating agent for the present invention.

Suitable fluoropolymers include homopolymers and copolymers that comprise repeating units derived from one or more fluorinated α-olefin monomers. The term "fluorinated α-olefin monomer" means an α-olefin monomer that includes at least one fluorine atom substituent. Suitable fluorinated α-olefin homopolymers include e.g., poly(tetrafluoroethylene), poly(hexafluoroethylene).

The second polymer preferably contains repeating units derived from styrene and acrylonitrile. More preferably, the second polymer comprises from 60 to 90 wt % repeating units derived from styrene and 10 to 40 wt % repeating units derived from acylonitrile.

In a preferred embodiment, the particle size of the polymerized fluoropolymer nucleating agent is in the range of 20 to 1000 micron, more preferably from 50 to 800 micron.

The cycloaliphatic polyester resin comprises a polyester having repeating units of the formula I:

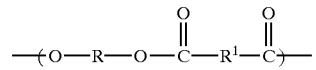

where at least one R or R1 is a cycloalkyl containing radical.

The polyester is a condensation product where R is the residue of an aryl, alkane or cycloalkane containing diol having 6 to 20 carbon atoms or chemical equivalent thereof, and R1 is the decarboxylated residue derived from an aryl, aliphatic or cycloalkane containing diacid of 6 to 20 carbon atoms or chemical equivalent thereof with the proviso that at least one R or R1 is cycloaliphatic. Preferred polyesters of the invention will have both R and R1 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are necessary to impart good rigidity to the polyester.

The polyester resins are typically obtained through the condensation or ester interchange polymerization of the diol or diol equivalent component with the diacid or diacid chemical equivalent component.

R and R1 are preferably cycloalkyl radicals independently selected from the following formula:

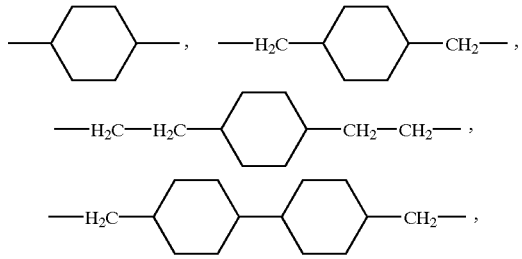

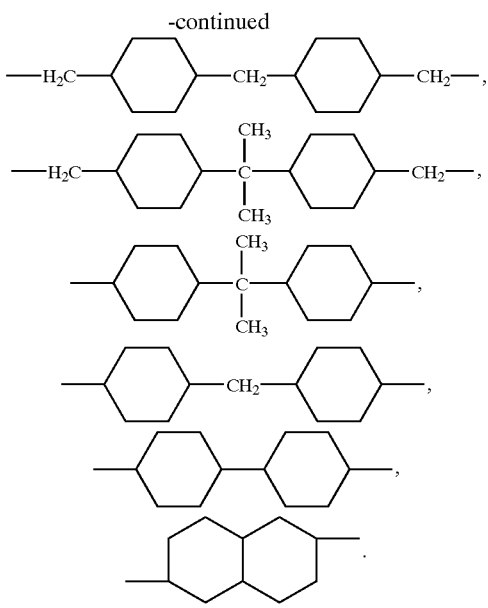

The preferred cycloaliphatic radical R1 is derived from the 1,4-cyclohexyl diacids and most preferably greater than 70 mole % thereof in the form of the trans isomer. The preferred cycloaliphatic radical R is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

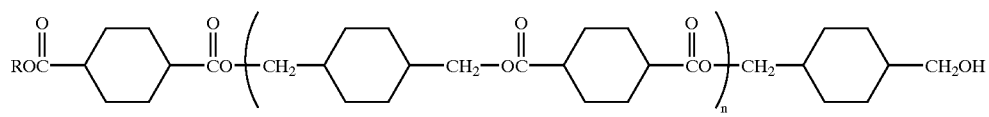

With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

The preferred aliphatic polyesters used in the present molding compositions have a glass transition temperature (Tg) which is above 50° C., more preferably above 60° C. and most preferably above about 70° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

Typically stabilizers are used at a level of 0.001–10 weight percent and preferably at a level of from 0.005–2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

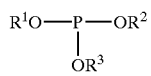

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

wherein M is a metal, x is a number ranging from 1 to 12 and y is a number ranging 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Mold releases such as pentaerythritol tetra esters, especially the stearate esters. Also preferred are carboxylic acid esters of other polyols like glycerol; for example glycerol mono stearate.

Incorporation of a light stabilizing additive in the PCCD composition, i.e., cycloaliphatic polyester alone or a cycloaliphatic polyester blend, provides additional benefits in weatherability.

In addition to UV absorbers, hindered amine light stabilizers (HALS) also contribute to increased weatherability of the structure.

Illustrative ultraviolet radiation absorbing compounds include 2-(benzotriazol-2-yl)4-(1,1,3,3-tetramethylbutyl) phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2'-ethylhexyl-2,2-diphenyl-1-cyanoacrylate, 2-(2'-hydroxy-4'-octyloxy) bis-4,6-(2',4'-dimethylphenyl)triazine, 2-ethyl-2'-ethoxy oxalanide, bis [2-hydroxy-5-methyl-3-(benzotriazol-2-yl) phenyl]-methane, bis[2-hydroxy-5-t-octyl-3-(benzotriazol-2-yl)phenyl]methane, 2,2'-(1,4-phenylene)bis[4H-3,1-benzoxazin-4-one], and 2-(2'-hydroxy-4-hexyloxy)-4,6-diphenyltriazine. Light stabilizers are incorporated in the cycloaliphatic polyester e.g., PCCD, resin in amounts of about 0.05 to about 10 weight percent.

It is contemplated that cycloalphatic polyester compositions can contain up to 50% by weight of additional polymeric materials in the blend, preferably less than 40 percent, and more preferably less than 30 percent, such as acrylic polymer or copolymer blend, polyalkylene phthalates or naphthanoates, polybutylene terephthalate polymers (PBT), polyethylene terephthalate polymers (PET), polypropylene terephthalate polymers (PPT), polyethylene naphthanoate polymers (PEN), polycyclohexane dimethanol terephthalates and styrene-acrylonitrile copolymers, preferably containing 25% –35% of acrylonitrile.

In addition, incorporation of so-called weatherable impact modifiers is contemplated. Examples of such impact modifiers are the following materials, or blends of two or more of these materials: (1) Paraloid EXL3300, which is Butylacrylate-Methacrylate core-shell rubber; (2) ASA-HRG, which is Acrylonitrile-Styrene-ButylAcrylate copolymer; (3) AES, which is Acrylonitrile-Styrene-EPDM copolymer, where EPDM is ethylene-propylene non conjugated diene elastomer; (4) Lotader AX8900, which is Ethylene-Methacrylate-Glycidylmethacrylate copolymer, with Methacrylate content of around 25%, Glycidylmethacrylate content of around 8%. The content of impact modifier is preferably less than 40% by weight, more preferably less than 30 percent, and most preferably less than 20 percent.

The method of blending the present compositions can be carried out by conventional techniques. One convenient method comprises melt blending the polyester, acrylic, impact modifier and other ingredients in powder or granular form, extruding the blend and comminuting into pellets or other suitable shapes. The ingredients are combined in any usual manner, e.g., by dry mixing followed by mixing in the melted state in an extruder.

Additionally, additives such as mold releases, antioxidants lubricants, nucleating agents such as talc and the like, other stabilizers including but not limited to UV stabilizers, such as benzotriazole, supplemental reinforcing fillers, and the like, flame retardants, pigments or combinations thereof may be added to the compositions of the present invention.

As set forth in the following examples, the properties are measured according to the following procedures:

Notched Izod (NI): This test procedure is based on the ISO 180 method. The result of the test is reported in terms of energy absorbed per unit of specimen width, and expressed in kilo Joules per square meter (kJ/m$^2$). Typically the final test result is calculated as the average of test results of five test bars.

Melt flow (MVR): This test procedure is based on the ISO 1133 method. The equipment used is an extrusion plastometer equipped with an automatic timer. Typical examples of this equipment would be the Zwick 4105 or the Göttfert MP-E. Before testing, the samples are dried for two hours at 100° C. The testing conditions are a melt temperature of 250° C., a total load of 2,160 gram, and a dwell time of 4 minutes. The test result is expressed in the unit cubic centimeter per 10 minutes (cc/10').

Flexural properties: This test procedure for measuring stiffness is based on the ISO 527 method. Typical test bars have the following dimensions: 4 mm by 10 mm by 170 mm. The final test result is calculated as the average of test results of five test bars. The test involves a three point loading system utilizing center loading on a simply supported beam. Instron and Zwick are typical examples of manufacturers of instruments designed to perform this type of test. The flexural modulus is the ratio, within the elastic limit, of stress corresponding strain and is expressed in mega Pascals (MPa). The maximum stress is the stress at which the sample breaks and is expressed in mega Pascals (MPa).

The Vicat B120 softening temperature is tested according to procedure ISO 306 and indicates the temperature at which the plastic sample starts to soften rapidly. The Vicat B120 softening temperature is the temperature at which a 1 mm indentation is reached with a round steel probe into the plastic sample under the application of a specific load. The samples are submerged in a silicon oil bath, which is heated by 120° C./h. The test is carried out on (parts of) tensile bars. The final test result is calculated as the average of test results of two test bars, and is expressed in degree Celsius (°C.).

Differential Scanning Calorimetry (DSC): Two different test procedures are used to characterize the crystallization behavior of a material:

(1) Temperature Ramp (T-ramp), whereby the material undergoes the following temperature profile: Heat up from 40° C. to 260° C. at 20° C. per minute, followed by a holding period of 2 minutes at 260° C. This is followed by a cool down from 260° C. to 40° C. at 20° C. per minute, which is referred to as the "$1^{st}$ cooldown". This is followed by a holding period of 2 minutes at 40° C. Finally this is followed by a heat up from 40° C. to 260° C. at 20° C. per minute, which is referred to as the "$2^{nd}$ heatup". The test results are the crystallization temperature, if any, during the $1^{st}$ cooldown, expressed as Tc in degree Celsius (°C.), and the melting temperature, if any, during the $2^{nd}$ heatup, expressed as Tm in degree Celsius (°C.).

(2) Isothermal, whereby the material undergoes the following temperature profile: Heat up from 40° C. to 260° C. at 200° C. per minute, followed by a holding period of 5 minutes at 260° C. This is followed by a cool down from 260° C. to a temperature 5° C. above the isothermal hold temperature of choice, at 200° C. per minute. This is followed by a cool down from this temperature 5° C. above the isothermal hold temperature of choice, to the actual isothermal hold temperature of choice at 10° C. per minute. This is followed by a holding period of 30 minutes at the actual isothermal hold temperature of choice. Finally the material is cooled down to 40° C. at 20° C. per minute. The test results are the crystallization half-time, if any, at a certain temperature, expressed as a time in minutes, together with the chosen isothermal hold temperature, expressed in degree Celsius (°C.).

EXAMPLE

The following examples are set forth herein to illustrate in more detail the preferred embodiments and to illustrate more clearly the principle and practice of this invention to those skilled in the art. They are not construed to limit the claims in any manner whatsoever. All compositional data are in weight percent unless otherwise indicated.

In Table 1 the mechanical and thermal properties of a series of materials are shown. As becomes clear from the composition, certain evaluations were performed in duplicate, which in this case means that the whole sequence of blending, compounding, injection molding and testing was repeated for these materials. Comparing examples of the invention (EX-1 through -3) with the reference materials (REF-1, REF-2) and the comparative examples (Com-1 through -4), it can be noted that the Vicat softening point, 3 point bending modulus, and 3 point bending maximum stress are marked improved.

From Tables 2 and 3, where the DSC results are reported, it becomes clear that the examples of the invention (EX-1 through -4) have significantly improved crystallization behavior (higher Tc at equal Tm, lower crystallization half-times at given isothermal hold temperatures) than both the reference materials (REF-1 through -4) and the comparative examples (Com-1 through -6).

Although the examples have shown various modifications of the present invention, other variations are possible in light of the above teachings. It is, therefore, to be understood that changes may be made in the particular embodiments of the invention described which are within the full intended scope of the invention as defined by the appended claims.

TABLE 1

| | REF-1 | REF-1 | EX-1 | EX-2 | EX-3 | Com-1 | Com-2 | Com-3 | Com-4 |
|---|---|---|---|---|---|---|---|---|---|
| PCCD | 83.75% | 83.75% | 83.35% | 83.35% | 83.35% | 83.35% | 83.35% | 83.35% | 83.35% |
| Paraloid EXL3300 | 15.00% | 15.00% | 15.00% | 15.00% | 15.00% | 15.00% | 15.00% | 15.00% | 15.00% |
| Tinuvin 622 | 0.50% | 0.50% | 0.50% | 0.50% | 0.50% | 0.50% | 0.50% | 0.50% | 0.50% |
| Tinuvin 234 | 0.30% | 0.30% | 0.30% | 0.30% | 0.30% | 0.30% | 0.30% | 0.30% | 0.30% |
| Irgaphos 168 | 0.20% | 0.20% | 0.20% | 0.20% | 0.20% | 0.20% | 0.20% | 0.20% | 0.20% |
| Irganox 1076 | 0.20% | 0.20% | 0.20% | 0.20% | 0.20% | 0.20% | 0.20% | 0.20% | 0.20% |
| 3,4 epoxycyclohexylmethyl-3,4 epoxycyclohexylcarboxylate | 0.05% | 0.05% | 0.05% | 0.05% | 0.05% | 0.05% | 0.05% | 0.05% | 0.05% |
| PTFE, PS 350–650 | | | 0.40% | 0.40% | | | | | |
| SAN-PTFE, PS 100–200 | | | | | | 0.40% | | | |
| PTFE, PS 8–15 | | | | | | | 0.40% | 0.40% | |
| Ultratalc 609 | | | | | | | | | 0.40% |
| Boron nitride | | | | | | | | | 0.40% |
| total | 100.00% | 100.00% | 100.00% | 100.00% | 100.00% | 100.00% | 100.00% | 100.00% | 100.00% |
| MVR (250C/2.16 Kg) (cc/10') | 17 | 17 | 17 | 17 | 17 | 17 | 17 | 17 | 17 |
| Vicat B120 (C) | 58 | 59 | 92 | 94 | 91 | 73 | 75 | 75 | 75 |
| Modulus, 3 point bending (MPa) | 953 | 900 | 1200 | 1200 | 1200 | 950 | 920 | 930 | 930 |
| Max. Stress, 3 point bending (MPa) | 37 | 36 | 47 | 46 | 46 | 37 | 37 | 37 | 37 |
| Izod Notched Impact (kJ/m$^2$) | 78 | 72 | 44 | 45 | 61 | 55 | 17 | 65 | 60 |

TABLE 2

|  | REF-1 | REF-2 | REF-3 | REF-4 | EX-1 | EX-2 | EX-3 | EX-4 |
|---|---|---|---|---|---|---|---|---|
| PCCD | 83.75% | 83.75% | 100% | 100% | 83.35% | 83.35% | 83.35% | 83.35% |
| Paraloid EXL3300 | 15.00% | 15.00% |  |  | 15.00% | 15.00% | 15.00% | 15.00% |
| Tinuvin 622 | 0.50% | 0.50% |  |  | 0.50% | 0.50% | 0.50% | 0.50% |
| Tinuvin 234 | 0.30% | 0.30% |  |  | 0.30% | 0.30% | 0.30% | 0.30% |
| Irgaphos 168 | 0.20% | 0.20% |  |  | 0.20% | 0.20% | 0.20% | 0.20% |
| Irganox 1076 | 0.20% | 0.20% |  |  | 0.20% | 0.20% | 0.20% | 0.20% |
| 3,4 epoxycyclohexylmethyl-3,4 epoxycyclohexylcarboxylate | 0.05% | 0.05% |  |  | 0.05% | 0.05% | 0.05% | 0.05% |
| PTFE PS 350–650 |  |  |  |  | 0.40% | 0.40% |  |  |
| SAN-PTFE, PS 100–200 |  |  |  |  |  |  | 0.40% | 0.40% |
| PTFE, PS 8–15 |  |  |  |  |  |  |  |  |
| Ultratalc 609 |  |  |  |  |  |  |  |  |
| Boron nitride |  |  |  |  |  |  |  |  |
| total | 100.00% | 100.00% |  |  | 100.00% | 100.00% | 100.00% | 100.00% |
| DSC T-ramp |  |  |  |  |  |  |  |  |
| Tc(peak, C) 1st Cooldown | 154 | 154 | 154 | 154 | 178 | 178 | 178 | 176 |
| Tm(peak,C) 2nd HeatUp | 219 | 220 | 219 | 219 | 220 | 220 | 219 | 220 |
| Isotermal |  |  |  |  |  |  |  |  |
| Cryst.1/2 time (min) @ 207 C | >30 | >30 | >30 | >30 | 8.2 | 9.6 | 9.5 | 11.7 |
| Cryst.1/2 time (min) @ 209 C | >30 | >30 | >30 | >30 | 12.5 |  | 16.1 | 18.5 |

TABLE 3

|  | EX-1 | EX-2 | EX-3 | EX-4 | Com-1 | Com-2 | Com-3 | Com-4 | Com-5 | Com-6 |
|---|---|---|---|---|---|---|---|---|---|---|
| PCCD | 83.35% | 83.35% | 83.35% | 83.35% | 83.35% | 83.35% | 83.35% | 83.35% | 83.75% | 83.75% |
| Paraloid EXL3300 | 15.00% | 15.00% | 15.00% | 15.00% | 15.00% | 15.00% | 15.00% | 15.00% | 15.00% | 15.00% |
| Tinuvin 622 | 0.50% | 0.50% | 0.50% | 0.50% | 0.50% | 0.50% | 0.50% | 0.50% | 0.50% | 0.50% |
| Tinuvin 234 | 0.30% | 0.30% | 0.30% | 0.30% | 0.30% | 0.30% | 0.30% | 0.30% | 0.30% | 0.30% |
| Irgaphos 168 | 0.20% | 0.20% | 0.20% | 0.20% | 0.20% | 0.20% | 0.20% | 0.20% | 0.20% | 0.20% |
| Irganox 1076 | 0.20% | 0.20% | 0.20% | 0.20% | 0.20% | 0.20% | 0.20% | 0.20% | 0.20% | 0.20% |
| 3,4 epoxycyclohexylmethyl-3,4 epoxycyclohexyl-carboxylate | 0.05% | 0.05% | 0.05% | 0.05% | 0.05% | 0.05% | 0.05% | 0.05% | 0.05% | 0.05% |
| PTFE, PS 350–650 | 0.40% | 0.40% |  |  |  |  |  |  |  |  |
| SAN-PTFE PS 100–200 |  |  | 0.40% | 0.40% |  |  |  |  |  |  |
| PTFE, PS 8–15 |  |  |  |  | 0.40% | 0.40% |  |  |  |  |
| Ultratalc 609 |  |  |  |  |  |  | 0.40% | 0.40% |  |  |
| Boron nitride |  |  |  |  |  |  |  |  | 0.40% | 0.40% |
| total | 100.00% | 100.00% | 100.00% | 100.00% | 100.00% | 100.00% | 100.00% | 100.00% | 100.00% | 100.00% |
| DSC T-ramp |  |  |  |  |  |  |  |  |  |  |
| Tc(peak,C) 1st Cooldown | 178 | 178 | 178 | 176 | 172 | 172 | 171 | 170 | 172 | 172 |
| Tm (peak. C) 2nd Heatup | 220 | 220 | 219 | 220 | 219 | 219 | 220 | 219 | 219 | 219 |
| Isotermal |  |  |  |  |  |  |  |  |  |  |
| Cryst.1/2 time (min) @ 207 C | 8.2 | 9.6 | 9.5 | 11.7 | 21.7 | 21.3 | >30 | >30 | 18.6 | 18.4 |
| Cryst.1/2 time (min) @ 209 C | 12.5 |  | 16.1 | 18.5 | >30 | >30 | >30 | >30 | 25.0 | >30 |

What is claimed is:

1. A polyester molding composition comprising a cycloaliphatic polyester resin and a nucleating agent comprising a fluoropolymer containing a second thermoplastic resin, wherein the nucleating agent is a free-flowing powder with a particle size in the range of 20 to about 1000 microns and the cycloaliphatic polyester resin comprises residues of a cyclic aliphatic diol and residues of a cyclic aliphatic diacid, wherein at least 50% mole of the residues are residues of cyclic diols and diacids and the remainder, if any, are residues of linear aliphatic diacids or diols.

2. A molding composition according to claim 1 wherein the free-flowing powder has a particle size in the range of 50 to 800 micron.

3. A molding composition according to claim 1 further comprising, in addition to the cycloaliphatic polyester component and nucleating agent, up to 50% by weight of an additional polymeric material selected from the group consisting of an acrylic polymer or copolymer blend, a polyalkylene phthalate or naphathanoate, and a styrene-acrylonitrile copolymer.

4. A molding composition according to claim 1 wherein said fluoropolymer includes homopolymers or copolymers that comprise repeating units derived from one or more fluorinated α-olefin monomers.

5. A molding composition according to claim 4 wherein said fluoropolymer comprises poly(tetra-fluoroethylene).

6. A molding composition according to claim 5 wherein said second thermoplastic resin comprises from 60 to 90 wt % repeating units derived from styrene and 10 to 40 wt % repeating units derived from acylonitrile.

7. A molding composition according to claim 1 wherein said second thermoplastic resin contains repeating units derived from styrene and acrylonitrile.

8. A molding composition according to claim 7 wherein the nucleating agent comprises from 30 to 70 wt % of the fluoroploymer and from 30 to 70 wt % of the second thermoplastic resin.

9. A molding composition according to claim 1 wherein said cycloaliphatic polyester resin comprises a polyester having repeating units of the formula I:

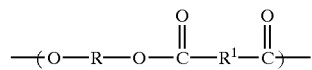

where R is the residue of an alkane or cycloalkane containing diol or $R^1$ is the residue of an alkane or cycloalkane containing diacid.

10. A molding composition according to claim 9 wherein said polyester is a condensation product where R is the residue of an alkane or cycloalkane containing diol having 6 to 20 carbon atoms, and $R^1$ is the decarboxylated residue derived from an aliphatic or cycloalkane containing diacid of 6 to 20 carbon atoms.

11. A molding composition according to claim 9 wherein both R and $R^1$ are cycloaliphatic.

12. An injection molded article prepared by injection molding a composition according to claim 11.

13. A molding composition of claim 1, wherein the cycloaliphatic polyester is poly(1,4-cyclohexane-dimethanol-1,4-dicarboxylate).

14. An injection molded article prepared by injection molding a composition according to claim 1.

* * * * *